UNITED STATES PATENT OFFICE.

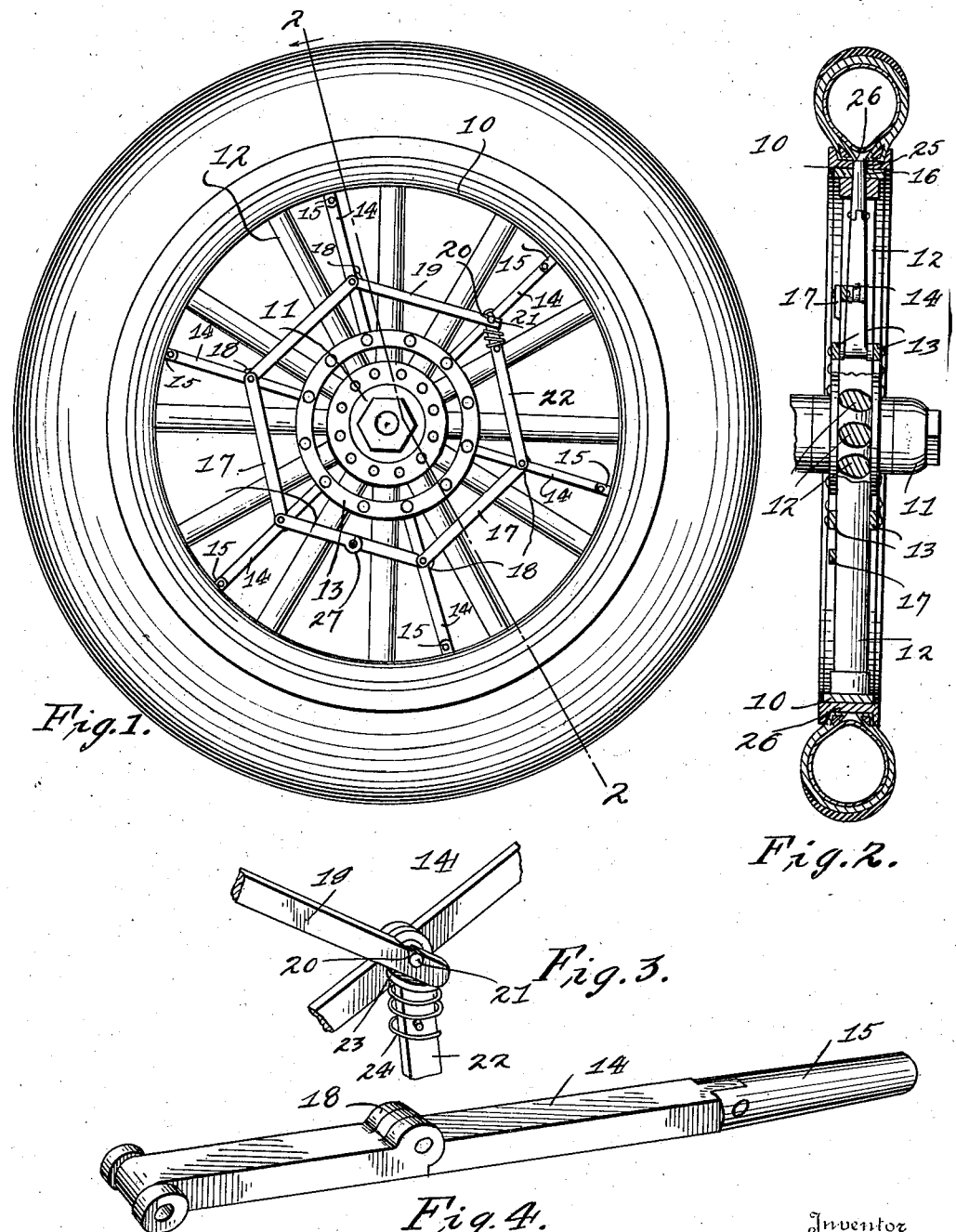

CHARLES E. GRANDEL, OF STATESVILLE, NORTH CAROLINA.

AUXILIARY RIM.

1,186,897.  Specification of Letters Patent.  Patented June 13, 1916.

Application filed July 23, 1915. Serial No. 41,552.

*To all whom it may concern:*

Be it known that I, CHARLES E. GRANDEL, a citizen of the United States, residing at Statesville, in the county of Iredell, State of North Carolina, have invented certain new and useful Improvements in Auxiliary Rims; and I do hereby declare the following to be a full, clear, and exact description of the invention, such as will enable others skilled in the art to which it appertains to make and use the same.

This invention relates to improvements in automobile wheels, and particularly to auxiliary rims therefor.

One object of the invention is to provide a novel and efficient means for fastening the auxiliary rim on to the wheel rim which obviates the use of the ordinary nuts and bolts.

Another object is to provide such a fastening means which can be quickly and easily operated to attach or detach the rim to or from the wheel, and which will effectively hold the auxiliary rim from accidental displacement.

Other objects and advantages will be apparent from the following description when taken in connection with the accompanying drawing.

In the drawing: Figure 1 is an elevation of a wheel showing the auxiliary rim attached to the wheel by my approved fastening device, Fig. 2 is a section on the line 2—2 of Fig. 1, Fig. 3 is a detail perspective of the locking device, and Fig. 4 is a detail perspective of one of the locking bolts.

Referring particularly to the accompanying drawing, 10 represents the rim of the wheel which is provided with the hub 11 and the spokes 12. Disposed on each side of the spokes and surrounding the hub are the rings 13 to which are connected the inner ends of the radially extending rods 14. Pivotally carried by the outer ends of these rods are the short bolt sections 15 which pass through openings 16 in the rim 10. A plurality of links 17 extend between and have their ends pivotally connected to the rods 14, at points intermediate the ends of said rods. At these points the rods 14 have the rule joints 18. One of the links 19 is provided with a notch 20 adapted for engagement with a pin 21 carried by the end of the next adjacent link 22. On this link 22 is a ring or collar 23 behind which is disposed a spring 24 for forcing the ring or collar against the notched end of the link 19 to hold the same in proper locked position. When this connection at 19 and 21 is broken, all of the lengths can be pushed around to break the joints 18 and thus cause the bolts 15 to be withdrawn within the openings 16. These bolts are adapted to pass through openings 25 in the auxiliary rim 26, and when the links 17, 19 and 22 are all properly positioned and the joints 18 straightened out the auxiliary rim will be firmly held on the rim of the wheel and all of the rods 14 held rigidly against movement.

To remove the auxiliary rim, it is only necessary to separate the link 19 from the link 22 and move the links so as to break the joints 18. This will occupy considerably less time than to remove the usual large number of nuts which hold the extra rim on the wheel. Another of the links is jointed as shown at 27 so that the joints of the rods can be more quickly broken when desired.

What is claimed is:

1. The combination with the rim of a wheel having a plurality of openings therethrough, a hub, and spokes connecting the hub and rim, of a plurality of radially extending jointed rods pivotally connected to the hub, pivotally connected bolt members carried by the outer ends of the rods and slidable through the openings of the rim, and means connecting the joints of the rods for holding the joints rigidly in position whereby the bolts are projected through the said openings.

2. The combination with the rim of a wheel having a plurality of openings therethrough, a hub, and spokes connecting the hub and rim, of a plurality of radially extending jointed rods pivotally connected to the hub, pivotally connected bolt members carried by the outer ends of the rods and slidable through the openings of the rim, links extending between the rods and pivotally connected to the said joints, and a separable fastening means connecting two of said links.

In testimony whereof, I affix my signature, in the presence of two witnesses.

CHARLES E. GRANDEL.

Witnesses:
R. M. CLOER,
R. C. BUNCH.

Copies of this patent may be obtained for five cents each, by addressing the "Commissioner of Patents, Washington, D. C."